(12) United States Patent
    Chiba et al.

(10) Patent No.: US 11,623,652 B2
(45) Date of Patent: Apr. 11, 2023

(54) MACHINE LEARNING METHOD AND MACHINE LEARNING SYSTEM

(71) Applicant: TOYOTA JIDOSHA KABUSHIKI KAISHA, Toyota (JP)

(72) Inventors: Hiroya Chiba, Susono (JP); Yohei Hareyama, Ninomiya (JP); Daiki Yokoyama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/536,615

(22) Filed: Nov. 29, 2021

(65) Prior Publication Data

US 2022/0169268 A1   Jun. 2, 2022

(30) Foreign Application Priority Data

Dec. 1, 2020   (JP) .............................. JP2020-199654

(51) Int. Cl.
  *B60W 50/06*    (2006.01)
  *G05B 13/02*    (2006.01)
  *G07C 5/00*    (2006.01)
(52) U.S. Cl.
  CPC ......... *B60W 50/06* (2013.01); *G05B 13/0265* (2013.01); *G07C 5/008* (2013.01)
(58) Field of Classification Search
  USPC ....................................................... 706/12
  See application file for complete search history.

(56) References Cited

U.S. PATENT DOCUMENTS

| | | | |
|---|---|---|---|
| 5,673,362 A | 9/1997 | Matsumoto | |
| 6,385,636 B1 | 5/2002 | Suzuki | |
| 2018/0032863 A1 | 2/2018 | Graepel et al. | |
| 2018/0089563 A1* | 3/2018 | Redding | G06N 3/0454 |
| 2018/0281810 A1* | 10/2018 | Tochioka | B60W 50/0098 |
| 2019/0065944 A1 | 2/2019 | Hotson et al. | |
| 2019/0147855 A1 | 5/2019 | Zhao et al. | |
| 2020/0134461 A1* | 4/2020 | Chai | G06N 3/0635 |

(Continued)

FOREIGN PATENT DOCUMENTS

DE   20 2016 004 627 U1   9/2016
DE   10 2018 120 635 A1   2/2019

(Continued)

*Primary Examiner* — Tyler D Paige
(74) *Attorney, Agent, or Firm* — Dinsmore & Shohl LLP

(57) ABSTRACT

A machine learning method performs training of values of model parameters forming a machine learning model, and is performed in a machine learning system including a vehicle having the machine learning model and a server able to communicate with the vehicle. The machine learning method includes: detecting, by the server, a current processing load of the server; determining, by the server, processing amounts of training respectively performed by the server and the vehicle, based on the processing load; performing, by the server, training of the values of the model parameters in accordance with the determined processing amount in the server; and performing, by the vehicle, training of the values of the model parameters in accordance with the determined processing amount in the vehicle. The server decreases a processing amount at the server when the processing load is relatively high compared to when it is relatively low.

10 Claims, 9 Drawing Sheets

(56) References Cited

U.S. PATENT DOCUMENTS

| | | | |
|---|---|---|---|
| 2020/0276972 A1 | 9/2020 | Ito | |
| 2021/0182739 A1* | 6/2021 | Farooq | .................... G06N 5/04 |
| 2021/0333764 A1* | 10/2021 | Kitani | .................. G05D 1/0088 |
| 2022/0063658 A1* | 3/2022 | Yokoyama | ............. G07C 5/008 |
| 2022/0169268 A1* | 6/2022 | Chiba | ................... B60W 50/06 |

FOREIGN PATENT DOCUMENTS

| | | |
|---|---|---|
| DE | 10 2018 128 003 A1 | 5/2019 |
| JP | H05-233565 A | 9/1993 |
| JP | H11-053326 A | 2/1999 |
| JP | 2006-244146 A | 9/2006 |
| JP | 2019-021201 A | 2/2019 |
| JP | 2019-094044 A | 6/2019 |

\* cited by examiner

L=1　　　　L=2　　　　L=3　　　　L=4

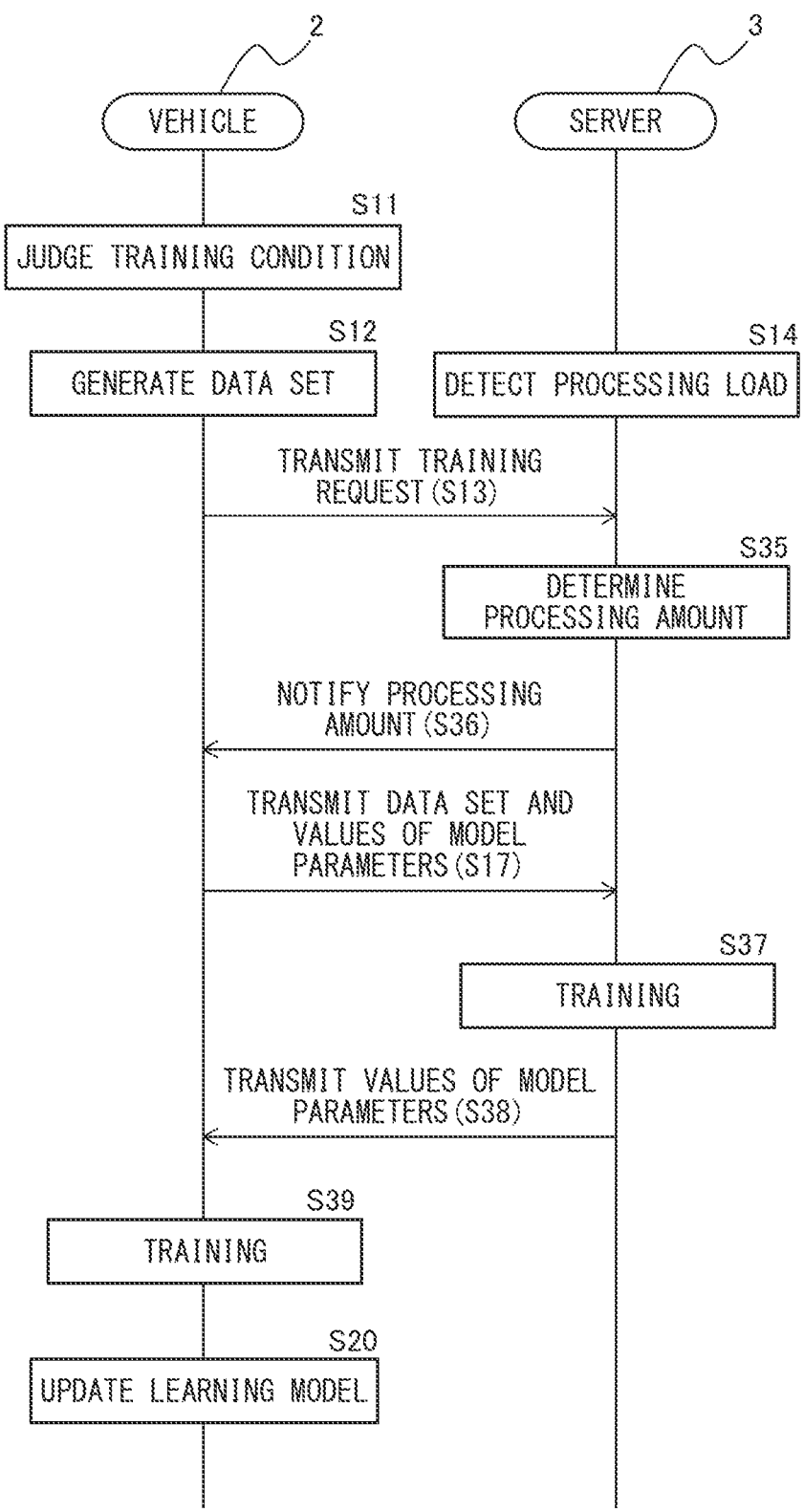

MACHINE LEARNING METHOD AND MACHINE LEARNING SYSTEM

CROSS-REFERENCE TO RELATED APPLICATIONS

This application claims priority to Japanese Patent Application No. 2020-199654 filed Dec. 1, 2020, which is incorporated herein by reference in its entirety including the specification, drawings and abstract.

FIELD

The present disclosure relates to a machine learning method and a machine learning system.

BACKGROUND

Known in the past is a system including vehicles having machine learning models used for control of equipment mounted in the vehicles and a server able to communicate with the vehicles (for example, JP 2019-021201 A). For example, in the system described in JP 2019-021201 A, the server stores data acquired from the vehicles as data sets for training, performs training values of parameters of the machine learning models based on the stored data sets, and notifies the results of training to the vehicles. Further, the vehicles perform image recognition processing by machine learning models in which the results of training notified from the server are reflected.

In particular, in the system described in JP 2019-021201 A, if data difficult for a vehicle to recognize is sent from the vehicle to the server, the values of the model parameters of the machine learning model for that vehicle are updated based on, in addition to the above data, data acquired from other vehicles in situations similar to the situation in which that data was acquired, at the server.

SUMMARY

In this regard, in the system described in JP 2019-021201 A, the server performs training of the machine learning models of the plurality of vehicles communicating with the server. For this reason, sometimes the server has to simultaneously perform training of the machine learning models of a large number of vehicles. In such a case, the load in computer processing in the training processing at the server (below, also referred to as the "processing load") is higher, and therefore there is the possibility of a remarkable drop in the processing ability in the training at the server or a shutdown of the training processing.

Therefore, in consideration of the above problem, an object of the present disclosure is to keep a processing load of a server from becoming excessively high along with training processing relating to machine learning models of vehicles.

The present disclosure has as its gist the following.

(1) A machine learning method for performing training of values of model parameters forming a machine learning model in a machine learning system including a vehicle having the machine learning model used for control of mounted equipment and a server able to communicate with the vehicle,
the machine learning method comprising:
transmitting, by the vehicle, a request signal requesting training of the values of the model parameters to the server;
detecting, by the server, a current processing load of the server;
determining, by the server, processing amounts or a processing ratio of training respectively performed by the server and the vehicle, based on the processing load, when receiving the request signal from the vehicle;
performing, by the server, training of the values of the model parameters based on a training data set for training of values of the model parameters in accordance with the determined processing amount or processing ratio of training in the server; and
performing, by the vehicle, training of the values of the model parameters based on the training data set in accordance with the determined processing amount or processing ratio of training in the vehicle, wherein
the server decreases a processing amount or processing ratio of training at the server when the processing load is relatively high compared to when it is relatively low.

(2) The machine learning method according to above (1), wherein the server determines to make all of the processing of the training be performed at the vehicle when the processing load is higher than a predetermined reference processing load, and to make all of the processing of the training be performed at the server when the processing load is equal to or less than the reference processing load.

(3) The machine learning method according to above (2), wherein the reference processing load is changed in accordance with a type of the machine learning model.

(4) The machine learning method according to above (3), wherein the reference processing load is higher if the machine learning model is a model relating to safety of the vehicle, compared to if the machine learning model is not a model relating to safety of the vehicle.

(5) The machine learning method according to any one of above (2) to (4), further comprising:
calculating an anticipated training time in the case of performing training at the vehicle based on the training data set and an anticipated communication time required for transmission and reception of the training data set and the model parameters between the vehicle and the server, wherein
the reference processing load is a load equal to or lower than a load by which a time period calculated by subtracting the anticipated communication time from the anticipated training time is required for performing training of the values of the model parameters at the server.

(6) A machine learning system including a vehicle having a machine learning model used for control of mounted equipment and a server able to communicate with the vehicle and performing training of values of model parameters forming the machine learning model, wherein
the vehicle comprises:
a training request transmitting part transmitting a request signal requesting training of the values of the model parameters to the server; and
a vehicle side training part performing training of the values of the model parameters based on a training data set for training of the values of the model parameters,
the server comprises:
a processing load detecting part detecting a current processing load of the server;
a processing amount determining part determining processing amounts or a processing ratio of training respectively performed by the server and vehicle, based on the processing load, when receiving the request signal from the vehicle; and a server side training part performing training of the values of the model parameters based on the training data set, the server side training part and the vehicle side training part respectively comprises training parts performing training of the values of the model parameters in accordance with the determined processing amounts or processing ratio of the training, and the processing amount determining part decreases a processing amount or processing ratio of training at the server side training part when the processing load is relatively high compared to when it is relatively low.

According to the present disclosure, the processing load of a server is kept from ending up becoming excessively high along with training processing relating to machine learning models of vehicles.

BRIEF DESCRIPTION OF DRAWINGS

FIG. 11 is an operation sequence diagram, similar to FIG. 7, of training processing according to a third embodiment.

DESCRIPTION OF EMBODIMENTS

Figure 1:
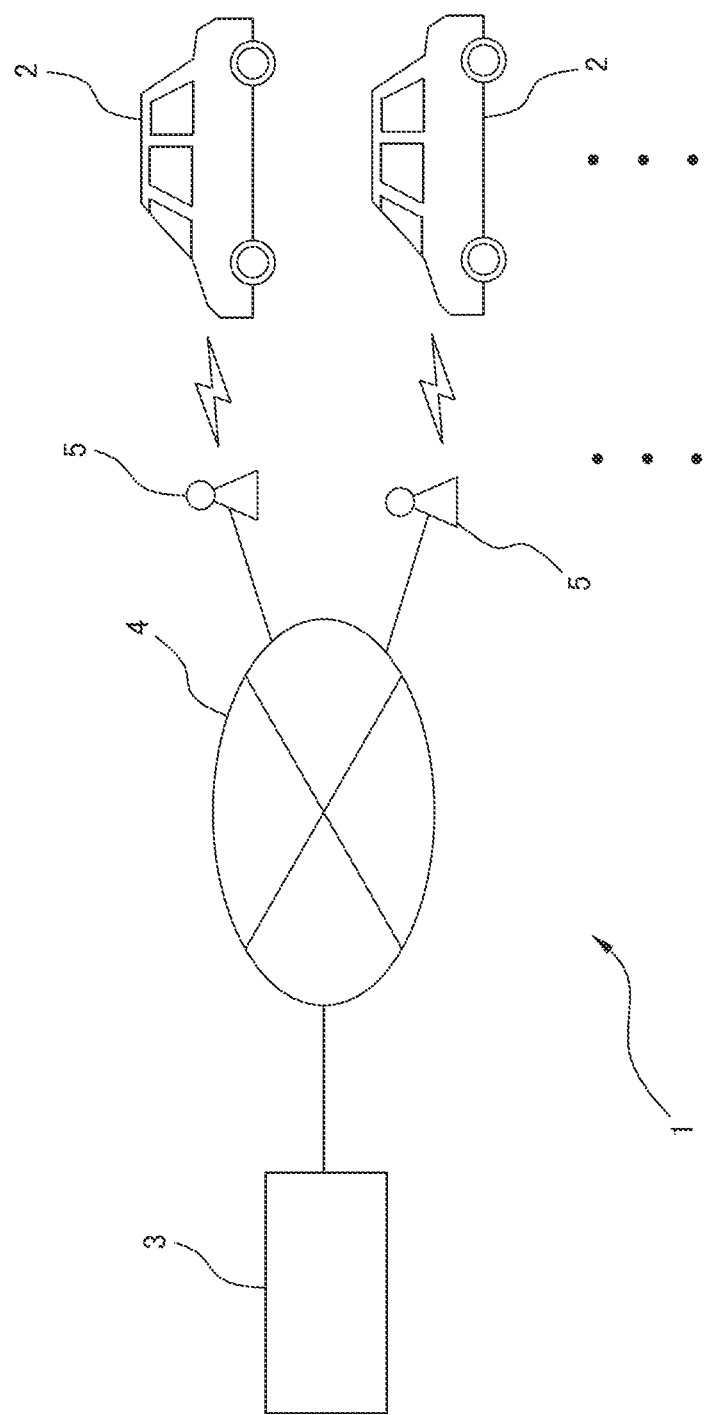
FIG. 1 is a schematic view of the configuration of a machine learning system according to a first embodiment.

Below, referring to the drawings, embodiments will be explained in detail. Note that, in the following explanation, similar component elements will be assigned the same reference notations.

First Embodiment

Configuration of Machine Learning System

First, referring to FIGS. 1 to 5, a machine learning system 1 and machine learning method performed by the machine learning system 1 according to a first embodiment will be explained. FIG. 1 is a schematic view of the configuration of the machine learning system 1 according to the first embodiment. The machine learning system 1 performs training of a machine learning model unique to each vehicle using a training data set including values of a plurality of state parameters showing states of the vehicle.

As shown in FIG. 1, the machine learning system 1 is provided with a plurality of vehicles 2 and a server 3 able to communicate with each other. Each of the plurality of vehicles 2 and the server 3 are configured to be able to communicate with each other through a communication network 4 configured by optical communication lines, etc., and a wireless base station 5 connected with the communication network 4 through a gateway (not shown). The communication between the vehicles 2 and wireless base station 5 is communication compliant with any communication protocol.

Figure 2:
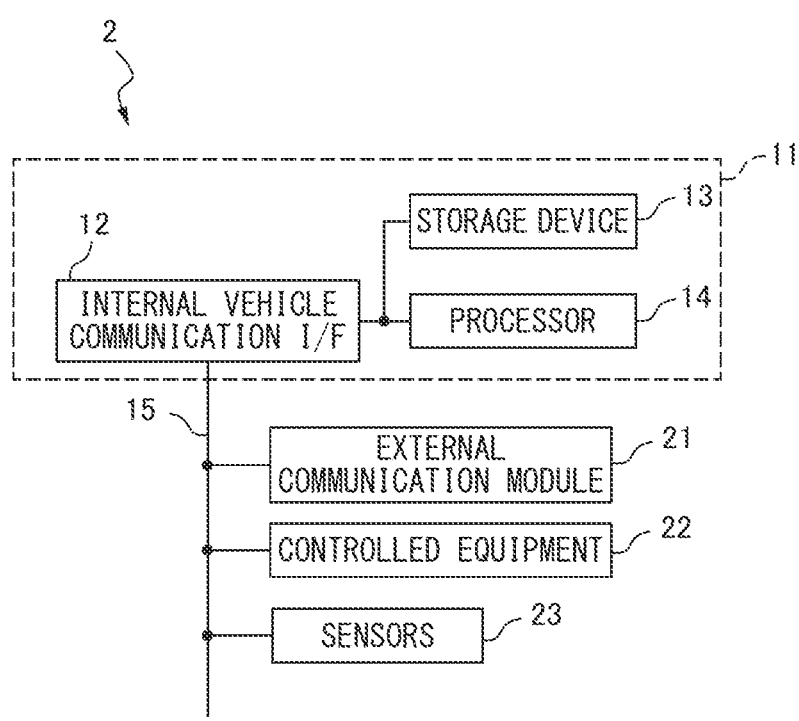
FIG. 2 is a view schematically showing a hardware configuration of a vehicle.

FIG. 2 is a view schematically showing the hardware configuration of a vehicle 2. As shown in FIG. 2, the vehicle 2 is provided with an electronic control unit (ECU) 11. The ECU 11 has an internal vehicle communication interface 12, a storage device 13, and a processor 14. The internal vehicle communication interface 12 and the storage device 13 are connected to the processor 14 through signal wires. Note that, in the present embodiment, the vehicle 2 is provided with a single ECU 11, but it may also be provided with a plurality of ECUs divided for different functions.

The internal vehicle communication interface 12 has an interface circuit for connecting the ECU 11 to an internal vehicle network 15 compliant with the CAN (controller area network) or another standard. The ECU 11 communicates with other pieces of vehicle-mounted equipment through the internal vehicle communication interface 12.

The storage device 13 is one example of a storage part for storing data. The storage device 13, for example, has a volatile semiconductor memory (for example, RAM), a nonvolatile semiconductor memory (for example, ROM), a hard disk drive (HDD), a solid state drive (SSD), or an optical recording medium. The storage device 13 stores computer programs for performing various processing at the processor 14, and various data, etc., used when various processing is performed by the processor 14. Therefore, the storage device 13 stores a machine learning model unique to each vehicle.

The processor 14 has one or more CPUs (central processing units) and their peripheral circuits. The processor 14 may further have a GPU (graphics processing unit) or a processing circuit such as a logic unit or arithmetic unit. The processor 14 performs various processing based on computer programs stored in the storage device 13. Therefore, if values of input parameters of the machine learning model are input, the processor 14 performs processing according to the machine learning model and outputs a value of an output parameter.

Figure 3:
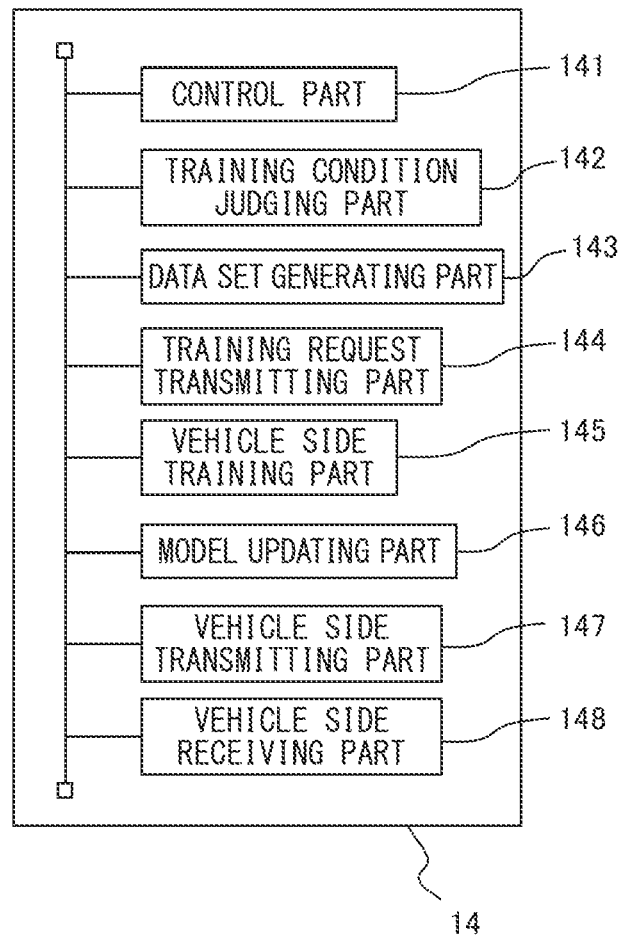
FIG. 3 is a functional block diagram of a processor of a vehicle.

FIG. 3 is a functional block diagram of the processor 14 of the vehicle 2. As shown in FIG. 3, the processor 14 is provided with a control part 141 using a machine learning model to control controlled equipment 22 of the vehicle 2, a training condition judging part 142 judging if a condition for performing training of a machine learning model stands, a data set generating part 143 generating a data set for training, a training request transmitting part 144 transmitting a request for training to the server 3, a vehicle side training part 145 performing training of the values of the model parameters forming the machine learning model, a model updating part 146 updating the machine learning model used in the control part 141, a vehicle side transmitting part 147 transmitting various data to the server 3, and a vehicle side receiving part 148 receiving various data from the server 3. These functional blocks of the processor 14 are, for example, functional modules realized by computer programs operating on the processor 14. Alternatively, these functional blocks of the processor 14 may be dedicated processing circuits provided at the processor 14. Details of the functional blocks of the processor 14 of the vehicle 2 will be explained later.

Further, as shown in FIG. 2, the vehicle 2 is further provided with an external vehicle communication module 21, a plurality of pieces of controlled equipment 22, and a plurality of sensors 23. The external vehicle communication module 21, controlled equipment 22, and sensors 23 are connected to the ECU 11 through the internal vehicle network 15.

The external vehicle communication module 21 is one example of a communicating part for communicating with equipment outside the vehicle. The external vehicle communication module 21 is, for example, equipment for communicating with the server 3. The external vehicle communication module 21, for example, includes a data communication module (DCM). The data communication module communicates with the server 3 through a wireless base station 5 and communication network 4.

The controlled equipment 22 is equipment for performing various control operations of a vehicle 2. Specifically, the controlled equipment 22, for example, includes a drive actuator of a throttle valve for adjusting an opening degree of a throttle valve provided in an intake passage of an internal combustion engine, an injector supplying fuel to a combustion chamber of an internal combustion engine, a spark plug for igniting fuel in a combustion chamber, a drive actuator of an EGR valve controlling an EGR rate of the internal combustion engine, a blower of an air-conditioner, a drive actuator of an air mix door controlling a flow of air of the air-conditioner, etc. These pieces of controlled equipment 22 are connected to the ECU 11 through the internal vehicle network 15, and are made to operate in accordance with drive signals from the ECU 11.

The sensors 23 are examples of detectors for detecting values of various state parameters (state quantities) relating to a vehicle 2. The sensors 23 include, for example, an air flow sensor for detecting a flow of intake air supplied to the internal combustion engine, an injection pressure sensor for detecting a fuel injection pressure from an injector of the internal combustion engine, an exhaust temperature sensor for detecting a temperature of the exhaust gas, an input detection sensor for detecting input of a driver at a touch panel, etc., a self-position sensor for detecting a self-position of the vehicle 2 (for example, GPS), etc. Furthermore, the sensors 23 include, for example, an outside air temperature sensor for detecting a temperature of the air in the surroundings of the vehicle 2 (outside air temperature), an outside air humidity sensor for detecting a humidity of the air in the surroundings of the vehicle 2 (outside air humidity), an atmospheric pressure sensor for detecting an atmospheric pressure in the surroundings of the vehicle 2, an internal vehicle temperature sensor for detecting a temperature inside a cabin of the vehicle 2 (internal cabin temperature), an internal vehicle humidity sensor for detecting a humidity inside the cabin of the vehicle 2 (internal cabin humidity), a sunlight sensor for detecting an amount of sunlight, etc. These sensors 23 are connected to the ECU 11 through the internal vehicle network 15 and transmit output signals to the ECU 11.

The server 3 is provided at the outside of the vehicle 2 and communicates with the vehicle 2 while running, through the communication network 4 and wireless base station 5. The server 3 receives various types of information from the vehicle 2 while running.

Figure 4:
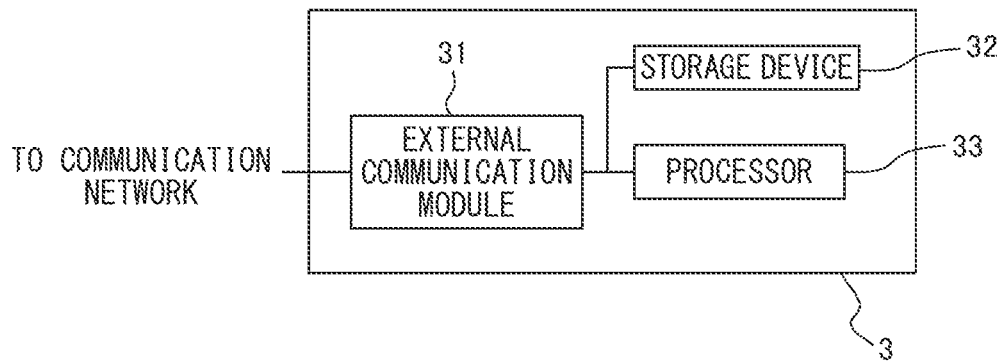
FIG. 4 is a view schematically showing a hardware configuration of a server.

FIG. 4 is a view schematically showing a hardware configuration of the server 3. The server 3, as shown in FIG. 4, is provided with an external communication module 31, storage device 32, and processor 33. Further, the server 3 may have an input device such as a keyboard or mouse and an output device such as a display.

The external communication module 31 is one example of a communicating part for communicating with equipment other than the server 3. The external communication module 31 is provided with an interface circuit for connecting the server 3 to the communication network 4. The external communication module 31 is configured to be able to communicate respectively with the plurality of vehicles 2 through the communication network 4 and wireless base station 5.

The storage device 32 is one example of a storage part for storing data. The storage device 32 of the server 3 is also provided with a volatile semiconductor memory (for example, RAM), nonvolatile semiconductor memory (for example, ROM), hard disk drive (HDD), solid state drive (SSD), or optical storage medium. The storage device 32 stores computer programs for the processor 33 to perform various processing, and various data used when various processing is performed by the processor 33.

The processor 33 has one or more CPUs and their peripheral circuits. The processor 33 may further have a GPU or logic unit or arithmetic unit or other such processing circuit. The processor 33 performs various processing routines based on computer programs stored in the storage device 32 of the server 3. In the present embodiment, the processor 33 of the server 3 functions as a machine learning device for performing training of a machine learning model.

Figure 5:
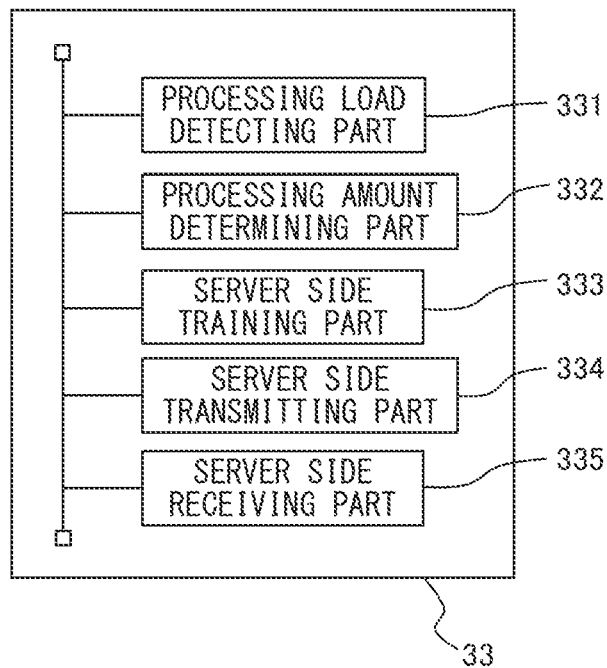
FIG. 5 is a functional block diagram of a processor of the server.

FIG. 5 is a functional block diagram of the processor 33 of the server 3. As shown in FIG. 5, the processor 33 is provided with a processing load detecting part 331 detecting a current processing load of the server 3, a processing amount determining part 332 determining processing amounts of machine learning to be respectively performed at the server 3 and the vehicle 2, a server side training part 333 performing training of the values of the model parameters forming a machine learning model, a server side transmitting part 334 transmitting various data to the vehicle 2, and a server side receiving part 335 receiving various data from the vehicle 2. These functional blocks of the processor 33 are, for example, functional modules realized by computer programs operated on the processor 33. Alternatively, these functional blocks of the processor 33 may be dedicated processing circuits provided at the processor 33. Details of the various functional blocks of the processor 33 of the server 3 will be explained later.

Machine Learning Model

Figure 6:
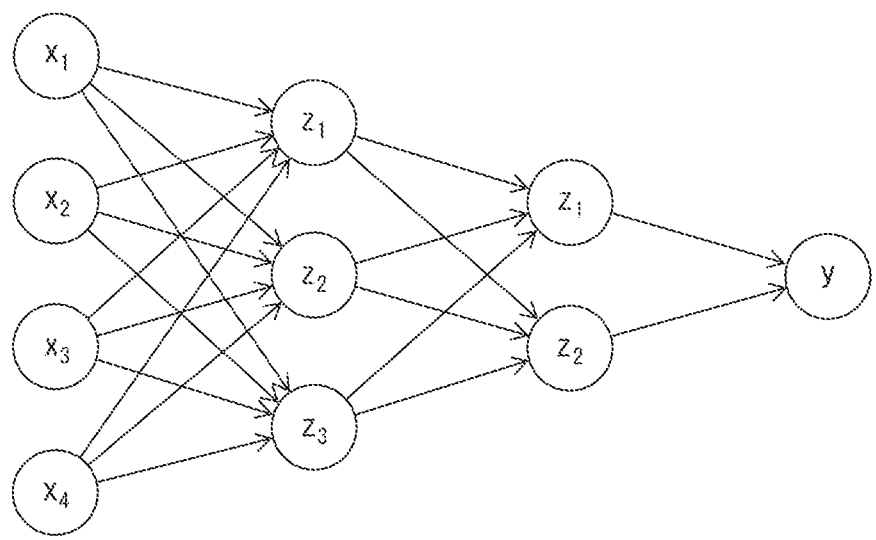
FIG. 6 shows one example of an NN model having a simple configuration.

In the present embodiment, in the control part 141 of the vehicle 2, when controlling controlled equipment 22 mounted in the vehicle 2, a machine learning model trained by machine learning is used. In the present embodiment, as the machine learning model, a neural network model (below, referred to as "NN model") is used. Below, referring to FIG. 6, an outline of an NN model will be explained. FIG. 6 shows one example of an NN model having a simple configuration.

The circle marks in FIG. 6 show artificial neurons. The artificial neurons are usually called "nodes" or "units" (in the Description, given as "nodes"). In FIG. 6, L=1 shows the input layer, L=2 and L=3 show hidden layers (or intermediate layers), and L=4 shows the output layer. In the present embodiment, the numbers of nodes of the hidden layers (L=2 and L=3) are smaller than the number of nodes of the input layer (L=1), and the number of nodes of a lower hidden layer is smaller than the number of nodes of a higher hidden layer (for example, the number of nodes of the hidden layer (L=3) is smaller than the number of nodes of the hidden layer (L=2)).

In FIG. 6, $x_m$ (m=1, 2, . . . M. In the example shown in FIG. 6, M=4) show the nodes of the input layer (L=1) and the output values from those nodes, while "y" shows the node of the output layer (L=4) and the output value of the same. Similarly, $z_k^{(L=2)}$(k=1, 2 . . . $K^{(L=2)}$. In the example shown in FIG. 6, $K^{(L=2)}$=3) show the nodes of the hidden layer (L=2) and the output values from those nodes, while $z_k^{(L=3)}$(k=1, 2, . . . $K^{(L=3)}$. In the example shown in FIG. 6, $K^{(L=3)}$=2) show the nodes of the hidden layer (L=3) and the output values from those nodes.

At the nodes of the input layer, the inputs are output as they are. On the other hand, at the nodes of the hidden layer (L=2), the output values $x_m$ (m=1, 2, 3, 4) of the nodes of the input layer are input, while at the nodes of the hidden layer (L=2), the sum input values "u" are calculated by using the respectively corresponding weights "w" and biases "b". For example, in FIG. 6, the sum input value $u_k^{(L=2)}$ calculated at a node shown by $z_k^{(L=2)}$(k=1, 2, 3) in the hidden layer (L=2) is calculated by way of the following equation (1):

[Formula 1]

$$u_k^{(L=2)} = \sum_{m=1}^{M} \left( x_m \cdot w_{km}^{(L=2)} \right) + b_k \quad (1)$$

Next, this sum input value $u_k^{(L=2)}$ is converted by an activation function "f", and the converted value is output from a node shown by $z_k^{(L=2)}$ of the hidden layer (L=2) as an output value $z_k^{(L=2)}(=f(u_k^{(L=2)}))$. On the other hand, at the nodes of the hidden layer (L=3), the output values $z_k^{(L=2)}$ (k=1, 2, 3) are input. At the nodes of the hidden layer (L=3), the sum input values "u" (=Σz·w+b) are calculated by using the respectively corresponding weights "w" and biases "b". The sum input values "u" are similarly converted by an activation function, and the converted values are output from the nodes of the hidden layer (L=3) as the output values $z_k^{(L=3)}$(k=1, 2). This activation function is for example a ReLU function σ.

Further, the output values $z_k^{(L=3)}$(k=1, 2) of the nodes of the hidden layer (L=3) are input to the node of the output layer (L=4), at which, the sum input value "u" (Σz·w+b) is calculated by using the respectively corresponding weight "w" and bias "b", or the sum input value "u" (Σz·w) by using only the respectively corresponding weight "w". For example, at the node of the output layer, an identity function is used as an activation function. In this case, the sum input value "u" calculated at the node of the output layer is output as is as the output value "y" from the node of the output layer.

In this way, an NN model is provided with an input layer, hidden layers, and an output layer. In the NN model, if values of a plurality of input parameters are input from the input layer, one or more output parameters corresponding to the input parameters are output from the output layer.

In the present embodiment, as such a machine learning model, for example, a model which outputs a temperature of the exhaust gas as a value of an output parameter if being input with an outside air temperature, amount of intake air, amount of fuel injection, timing of fuel injection, fuel injection pressure, or EGR rate as values of input parameters, is used. In the control part 141 of the host vehicle 2, the temperature of the exhaust gas is output as the output parameter, by inputting values of state parameters detected by the sensors 23 and control command values from the ECU 11 to the controlled equipment 22 to this machine learning model as values of input parameters. The control part 141 controls the controlled equipment 22 relating to the internal combustion engine (for example, actuators for driving throttle valves, injectors, spark plugs, etc.) based on the output temperature of the exhaust gas. Here, there is a delay in response in the exhaust temperature sensor for detecting the temperature of the exhaust gas, therefore if controlling the internal combustion engine based on the output of the exhaust temperature sensor, it was not necessarily possible to suitably control the internal combustion engine. As opposed to this, no delay occurs in calculation of the temperature of the exhaust gas using the machine learning model, therefore it is possible to more suitably control the internal combustion engine by controlling the controlled equipment 22 relating to the internal combustion engine using the temperature of the exhaust gas calculated by the machine learning model.

Alternatively, as such a machine learning model, for example, a model which outputs a target temperature of an air-conditioner as a value of the output parameter if being input with an outside air temperature, outside air humidity, internal vehicle temperature, internal vehicle humidity, and amount of sunlight as the values of the input parameters, may be used. In this case, in the control part 141 of the vehicle 2, by inputting values of the state parameters detected by the sensors 23 or control command values from the ECU 11 to the controlled equipment 22, as input parameters into such a machine learning model, a target temperature of the air-conditioner is output as an output parameter. The ECU 11 controls the controlled equipment 22 relating to the air-conditioner (for example, blower of air-conditioning equipment, actuator for driving air mix door, etc.) so that the internal vehicle temperature becomes the target temperature output from the machine learning model.

Note that, various models can be used as the machine learning model. Therefore, various state parameters such as the outside air temperature, outside air humidity, atmospheric pressure, internal cabin temperature, internal cabin humidity, amount of sunlight, amount of intake air, intake temperature, fuel injection pressure, fuel injection timing, amount of fuel injection, air-fuel ratio, ignition timing, engine cooling water temperature, and supercharging pressure are used as the input parameters. Further, various state parameters expressing states of the vehicle such as the temperature of the exhaust purification catalyst, concentration of the $NO_X$ in the exhaust gas, engine output torque, and internal cabin humidity are used as the output parameters.

Training of Machine Learning Model

Next, the training of the above machine learning model (NN model) will be explained. To improve the precision of this machine learning model, it is necessary to perform training of the model parameters forming the machine learning model (below, also referred to as "training of the machine learning model"). Therefore, in the present embodiment, the vehicle side training part 145 of the vehicle 2 or the server side training part 333 of the server 3 performs training of the machine learning model. Specifically, in the training of the vehicle side training part 145 or the server side training part 333, the values of all of the model parameters of the machine learning model (in the case of NN model, weights "w", biases "b", etc.) are calculated so that if the values of the input parameters are input to the machine learning model, a suitable value of the output parameter corresponding to these values of the input parameters will be output from the machine learning model. Below, the training method of the training of the machine learning model performed at the vehicle side training part 145 or the server side training part 333 will be briefly explained.

In training a machine learning model, a training data set including measured values of state parameters is used. The training data set is comprised of combinations of the plurality of measured values of the plurality of input parameters and the plurality of measured values of at least one output parameter (grand truth data) corresponding to these measured values. In the present embodiment, the measured values of the input parameters and the measured values of the output parameters are values detected by the sensors 23 of the vehicle 2 or control command values from the ECU 11 to the controlled equipment 22. Further, in the present embodiment, when performing training of the machine learning model at the server 3, the training data set is transmitted from the vehicle 2 to the server 3. Note that the training data set may also be comprised of measured values of the input parameters and the measured value of the output parameter which have been preprocessed (normalized, standardized, etc.)

The vehicle side training part 145 or the server side training part 333 uses the training data set for performing training of the values of the model parameters of the machine learning model. In performing training of the machine learning model, the vehicle side training part 145 or the server side training part 333, for example, uses known error backpropagation to repeatedly update the values of the model parameters (weights "w" and biases "b") of the machine learning model so that the difference between the output value of the machine learning model and the measured value of the output parameter included in the training data set becomes smaller. As a result, the machine learning model is trained and a trained machine learning model is generated. The values of the model parameters (weights "w" and biases "b") forming the trained machine learning model are stored in the storage device 13 of the vehicle 2 or the storage device 32 of the server 3.

Training Processing of Machine Learning Model

Next, referring to FIGS. 7 and 8, the flow of the training processing of a machine learning model in the vehicle 2 or the server 3 will be explained. In the present embodiment, the part performing training of the machine learning model is changed according to the processing load at the server 3. In particular, in the present embodiment, if the processing load at the server 3 is high, the training is performed by the vehicle 2, while if the processing load at the server 3 is low, the training is performed by the server 3. Therefore, in the present embodiment, there are cases where training of the machine learning model is performed by the vehicle 2 and cases where the training is performed at the server 3. Therefore, below, the flow of the training processing in the case where the training is respectively performed at the vehicle 2 and the server 3 will be explained.

Figure 7:
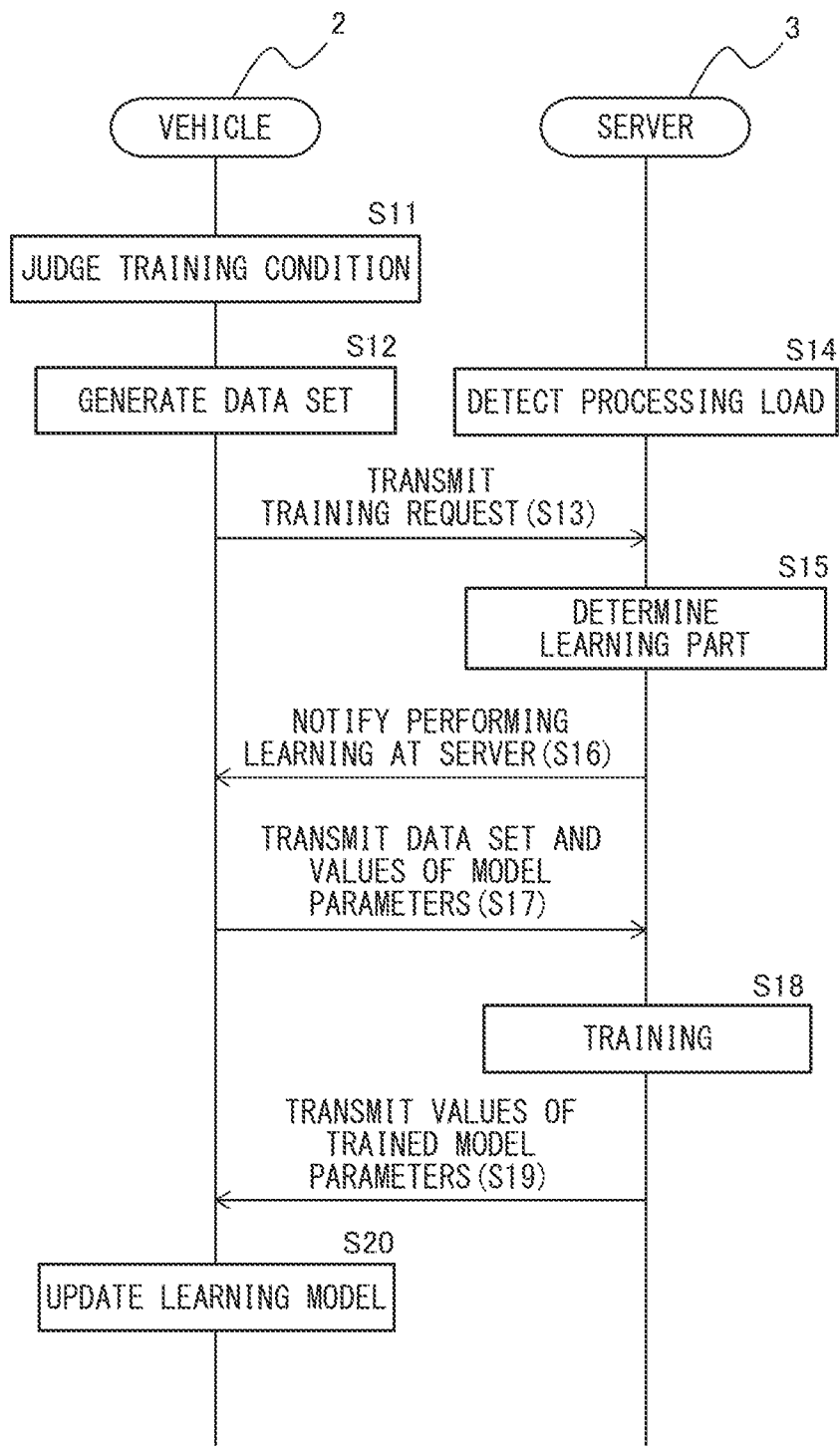
FIG. 7 is an operation sequence diagram of training processing in a case where training of a machine learning model is performed by the server.

FIG. 7 is an operation sequence diagram of training processing in a case where training of the machine learning model is performed by the server 3. Therefore, FIG. 7 shows the flow of training processing in the case where the processing load at the server 3 is low.

The training condition judging part 142 of the vehicle 2 periodically judges if a condition for performing training of the machine learning model of the vehicle 2 stands (step S11). The training of the machine learning model is, for example, performed every certain time period, every certain running distance, or every certain running time. Therefore, the training condition judging part 142 judges that the condition for performing training of the machine learning model of the vehicle 2 stands, if for example a certain time period has elapsed from the previous performance of training. Here, the optimum values of the model parameters of the machine learning model change due to deterioration of the controlled equipment 22 over time, or changes in the interests of the user. By periodically performing training of the values of the model parameters of the machine learning model in such a way, it is possible to maintain the values of the model parameters at suitable values.

Note that, the training of the machine learning model may also be performed at a timing different from the abovementioned timing. Therefore, the training of the machine learning model, for example, may be performed in the case where some sort of abnormality has occurred in the controlled equipment 22, command values of which are used as input parameters of the machine learning model, or in the case where some sort of abnormality has occurred in the sensors 23 detecting the values of the input parameters of the machine learning model. Therefore, in this case, the training condition judging part 142 judges that the training condition of the machine learning stands, if there is an abnormality in the controlled equipment 22 or sensors 23. Specifically, for example, the training condition of the machine learning stands, if it is judged by on-board diagnosis that an abnormality has occurred in such controlled equipment 22 or sensors 23, or if the predicted value output by the machine learning model differs from the measured value detected later by the sensors 23 by equal to or greater than a reference value.

If the training condition stands, the data set generating part 143 of the vehicle 2 prepares the training data set (step S12). The data set generating part 143 generates the training data set, based on the detected values detected by the sensors 23 of the vehicle 2 during an given time period and the control command values transmitted from the ECU 11 to the controlled equipment 22 during the given time period. The data set generating part 143 generates the training data set based on the detected values and control command values acquired after the training condition of the machine learning stands. Alternatively, the data set generating part 143 may also store the detected values and control command values in the storage device 13 in advance starting before the training condition of the machine learning stands, and generate the training data set based on the detected values and control command values which had been stored, after the training condition of the machine learning stands. Further, the data set generating part 143 may also preprocess (normalize, standardize, etc.) the detected values and control command values to generate the training data set. The generated training data set is stored in the storage device 13 of the ECU 11.

If the training data set is generated, a training request transmitting part 144 of the vehicle 2 transmits a request signal requesting training of the values of the model parameters of the machine learning model, through the outside communication module 21 to the server 3 (step S13). At this time, the training request transmitting part 144 may also transmit information required for calculating the processing load at the server 3 accompanying training, together with the request signal. Specifically, the training request transmitting part 144, for example, transmits the size of the training data set prepared by the data set generating part 143, the configuration of the machine learning model (number of layers, number of nodes of the layers, etc.) or the type of the machine learning mode (for example, model contributing to safety of the vehicle 2, model contributing to the environment, and other classifications). Provided, however, that if information such as the configuration of the machine learning model corresponding to the vehicle 2 is stored in advance in the storage device 32 of the server 3, the training request transmitting part 144 does not transmit such information.

On the other hand, the processing load detecting part 331 of the server 3 continuously or periodically detects the current processing load of the server 3 (step S14). The processing load of the server 3 is a load relating to the computer processing of the server 3. For example, the processing load changes according to the rate of usage of the processor 33 of the server 3 (rate of use of CPU or GPU), and further changes in accordance with the available capacity in the semiconductor memory in the storage device 32 of the server 3. The processing load of the server 3 is detected as being higher, as the rate of usage of the processor 33 is larger, and is detected as being higher, as the available capacity in the semiconductor memory is smaller.

The processing load of the server 3 changes according to the amount of computer processing performed at the server 3. Therefore, if the server 3 is performing training of machine learning models of a large number of other vehicles or if the server 3 is performing various computer processing besides training, the processing load of the server 3 is detected as being high. On the other hand, if the server 3 is not performing training of machine learning models of other vehicles or not performing computer processing besides training, the processing load of the server 3 is detected as being low.

Note that, the processing load detecting part 331 may also detect not only the current processing load of the server 3, but also the future processing load of the server 3. The future processing load is, for example, detected based on the task which the processor 33 of the server 3 is planned to process. Further, the processing load detecting part 331 need not continuously or periodically detect the processing load, but may be configured so as to detect the load processing when the server side receiving part 335 receives a request signal through the external communication module 31.

If the server side receiving part 335 receives a request signal through the external communication module 31, the processing amount determining part 332 determines the part performing the training of the values of the model parameters of the machine learning model, among the server 3 and the vehicle 2, based on the current processing load of the server 3 detected by the processing load detecting part 331 (step S15). In particular, in the present embodiment, the processing amount determining part 332 judges if the current processing load of the server 3 is higher than a predetermined reference processing load. When it is judged that the current processing load of the server 3 is higher than the predetermined reference processing load, the processing amount determining part 332 determines to make all of the processing at the training of the machine learning model be performed at the processor 14 of the vehicle 2, that is, determines to make the processing amount of the training performed at the processor 33 of the server 3 zero. On the other hand, when it is judged that the current processing load of the server 3 is equal to or less than the above reference processing load, the processing amount determining part 332 determines to make all of the processing at the training of the machine learning model be performed by the processor 33 of the server 3, that is, determines to make the processing amount of the training performed at the processor 14 of the vehicle 2 zero. In the present embodiment, the reference processing load is a predetermined fixed value (for example, which is 80% if the maximum value of the processing load of the server 3 is 100%).

Note that, the reference processing load may be a variable value rather than a predetermined fixed value. For example, the reference processing load may be changed based on the type of the machine learning model transmitted by the training request transmitting part 144 to the server 3. Specifically, the reference processing load becomes lower in the order of the case where the machine learning model is a model relating to the safety of the vehicle 2, the case where the machine learning model is a model relating to the environmental load due to the vehicle 2, and the case where the machine learning model is a model relating to the comfort of the passengers inside the vehicle 2. Therefore, the reference processing load is set higher if the machine learning model is a model relating to the safety of the vehicle 2, compared with if the machine learning model is not a model relating to the safety of the vehicle 2.

The model relating to the safety of the vehicle 2 may include, for example, a model used for detecting an abnormality in controlled equipment 22 relating to the operation of the vehicle mounted in the vehicle 2 (for example, the internal combustion engine or electric motor, braking device, steering device, etc.) or sensors 23 relating to the safety (for example, external camera, driver monitoring camera, radar, etc.). Such a model includes, specifically, for example, a model having values of state parameters detected by various sensors 23 or control command values from the ECU 11 to the controlled equipment 22 as input parameters and having the presence of any breakdown of the equipment as an output parameter. Further, the model relating to the environmental load due to the vehicle 2 may include, for example, a model estimating the temperature of the exhaust gas explained above. In addition, the model relating to the comfort of the passengers inside the vehicle 2 may include, for example, a model estimating a target temperature of the air-conditioning device explained above.

Here, the reference processing load expresses the degree of priority by which the training is performed at the server 3. If the reference processing load is low, it is then difficult to perform training at the server 3. Accordingly, training is easy to perform at the vehicle 2 where the time taken for the training is long. Therefore, the reference processing load being low means that the degree of priority of training being performed at the server 3 is low. Conversely, the reference processing load being high means that the degree of priority of training being performed at the server 3 is high. Therefore, as explained above, by changing the reference processing load according to the type of the machine learning model, it is possible to raise the degree of priority, of the training performed at the server 3, of a model relating to the safety of the vehicle 2. Further, it is possible to lower the degree of priority, of training performed at the server 3, of a model relating to the comfort of the passengers.

If it is determined by the processing amount determining part 332 to perform the training of the machine learning model at the server 3, the server side transmitting part 334 transmits a notification of performing the training at the server 3, to the vehicle 2 through the external communication module 31 (step S16).

If the vehicle side receiving part 148 receives a notification of performing the training at the server 3, the vehicle side transmitting part 147 transmits the information required for performing the training of the machine learning model of the vehicle 2, through the outside communication module 21 (step S17). The information required for performing the training, for example, includes the training data set generated by the data set generating part 143 and the current values of the model parameters of the machine learning model.

If the server side receiving part 335 receives information required for performing training through the external communication module 31, the server side training part 333 performs the training of the values of the model parameters of the machine learning model (step S18). The server side training part 333 uses the current values of the model parameters transmitted from the vehicle 2 as the initial values, and updates, by using the training data set, the values of the model parameters by the above-mentioned error backpropagation or other known technique. As a result, the trained machine learning model (more specifically, a retrained machine learning model based on the new training data set) is generated by the server side training part 333. The values of the model parameters (weights "w" and biases "b") forming the trained machine learning model are stored in the storage device 32 of the server 3.

If the training of the machine learning model at the server side training part 333 is completed, the server side transmitting part 334 transmits the values of the model parameters obtained by performing the training by the server side training part 333, through the external communication module 31 to the vehicle 2 (step S19).

If the vehicle side receiving part 148 of the vehicle 2 receives the values of the model parameters from the server 3 through the outside communication module 21, the model updating part 146 of the vehicle 2 updates the values of the model parameters forming the machine learning model used in the control part 141, to the values received from the server 3 (step S20). After that, the control part 141 controls the controlled equipment 22 based on the machine learning model using the updated values of the model parameters.

As explained above, in the example shown in FIG. 7 according to the present embodiment, it is judged that the current processing load of the server 3 is equal to or less than the reference processing load. In this case, it will be understood that the amount of processing of the training at the vehicle 2 is determined to be zero, and the amount of processing of the training at the server 3 is determined to be the entire amount of processing of the training based on the training data set. In other words, in this case, it will be understood that the processing ratio of the training performed at the vehicle 2 and the training performed at the server 3 is determined to be 0:1.

Figure 8:
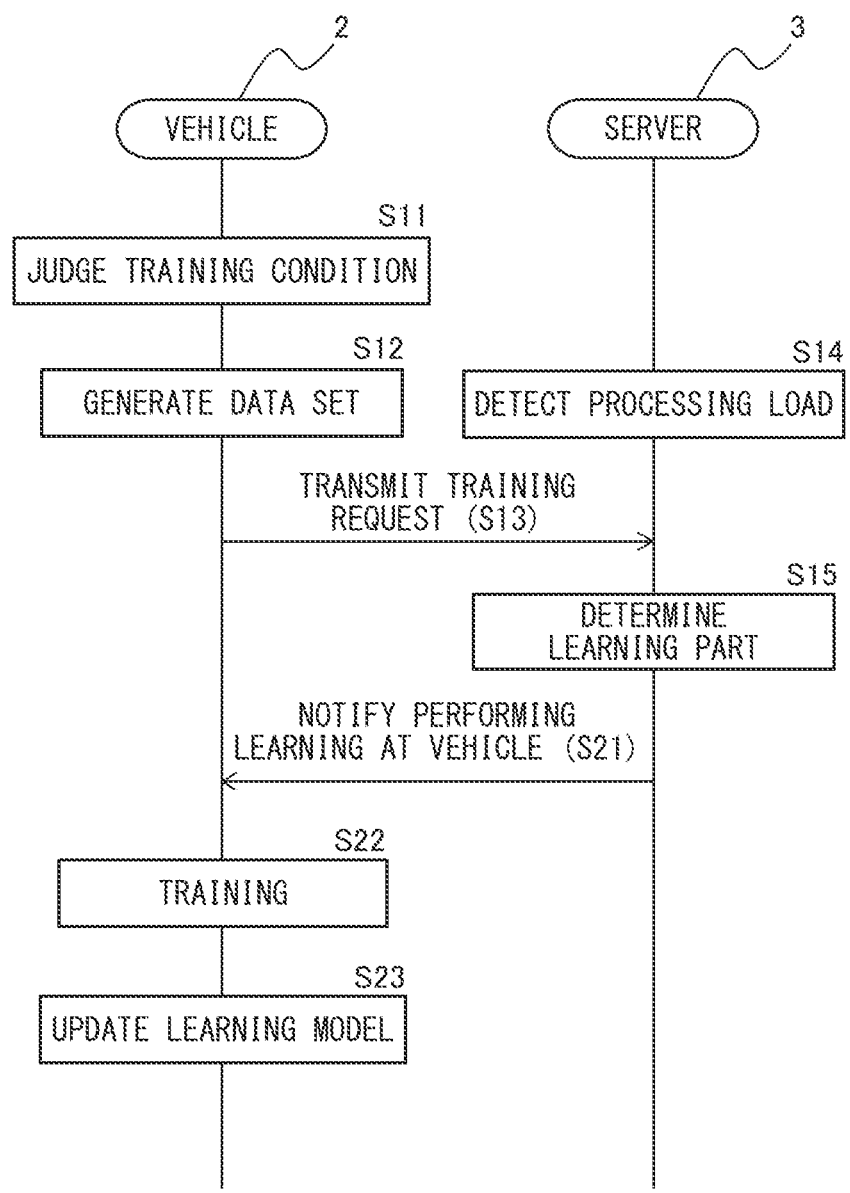
FIG. 8 is an operation sequence diagram of training processing in a case where training of a machine learning model is performed by a vehicle.

FIG. 8 is an operation sequence diagram of training processing in a case where training of the machine learning model is performed by the vehicle 2. Therefore, FIG. 8 shows the flow of training processing in the case where the processing load at the server 3 is high.

As will be understood from FIG. 8, even if the training of the machine learning model is performed by the vehicle 2, until determining the part performing the training of the machine learning model (steps S11 to S14), similar processing to the case where the training of the machine learning model is performed by the vehicle 2, is performed.

In the example shown in FIG. 8 as well, the processing amount determining part 332 determines the part performing the training of the machine learning model among the server 3 and the vehicle 2, based on the current processing load of the server 3 (step S15). Further, if at step S15 it is determined by the processing amount determining part 332 to perform the training of the machine learning model at the vehicle 2, the server side transmitting part 334 transmits a notification of performing the training at the server 3, to the vehicle 2 through the external communication module 31 (step S21).

If the vehicle side receiving part 148 receives a notification of performing the training at the vehicle 2, the vehicle side training part 145 performs the training of the values of the model parameters of the machine learning model without the training data set and the current values of the model parameters being transmitted to the server 3 (step S22). The training at the vehicle side training part 145 is performed in the same way as the training at the server side training part 333, whereby the vehicle side training part 145 generates a trained machine learning model. The values of the model parameters forming the trained machine learning model are stored in the storage device 32 of the vehicle 2.

If the training of the machine learning model at the vehicle side training part 145 is completed, the model updating part 146 of the vehicle 2 updates the values of the model parameters forming the machine learning model used in the control part 141, to the values obtained by performing training at the vehicle side training part 145 (step S23). After that, the control part 141 controls the controlled equipment 22, based on the machine learning model using the updated values of the model parameters.

As explained above, in the example shown in FIG. 8 according to the present embodiment, it is judged that the current processing load of the server 3 is higher than the reference processing load. In this case, it will be understood that the amount of processing of the training performed at the server 3 is determined to be zero and the amount of processing of the training performed at the vehicle 2 is determined to be the entire amount of processing of the training based on the training data set. In other words, in this case, it will be understood that the processing ratio of the training performed at the vehicle 2 and the training performed at the server 3 is determined to be 1:0.

Effects

According to the machine learning system 1 and the machine learning method performed in the machine learning system 1 according to the above embodiment, when the processing load at the server 3 is low, the training of the machine learning model of the vehicle 2 is performed at the server 3, while when the processing load at the server 3 is high, the training of the machine learning model of the vehicle 2 is performed at the vehicle 2. As a result, the training of the machine learning model is performed at the server 3 by as fast a processing speed as possible while the processing load of the server 3 is kept from becoming excessively high even if there are requests for performing training at the server 3 from a large number of vehicles.

Second Embodiment

Next, referring to FIGS. 9 and 10, a machine learning system 1 according to a second embodiment and a machine learning method performed at the machine learning system 1 according to the second embodiment will be explained.

The configuration and processing of the machine learning system 1 according to the second embodiment are basically similar to the configuration and processing of the machine learning system 1 according to the first embodiment. Below, the points of difference from the machine learning system 1 according to the first embodiment will be focused on in the explanation.

In the machine learning system 1 according to the first embodiment, the reference processing load used in determining the part performing the training of the machine learning model among the server 3 and the vehicle 2 is a fixed value or a value changing according to the type of the machine learning model. As opposed to this, in the present embodiment, the reference processing load is set considering the time required until the trained values of the model parameters are obtained at the vehicle 2 if performing training at the server 3 (below, also referred to as the "time required for server processing") and the time required until the trained values of the model parameters are obtained at the vehicle 2 if performing training at the vehicle 2 (below, also referred to as the "time required for vehicle processing").

More specifically, in the present embodiment, the reference processing load is set so that if the time required for server processing is longer than the time required for vehicle processing, the training is performed at the vehicle 2 since the need for performing processing at the server 3 is low, while if the time required for server processing is equal to or less than the time required for vehicle processing, the training is performed at the server 3 or the vehicle 2. Below, the specific technique for setting the reference processing load will be explained.

Figure 9:
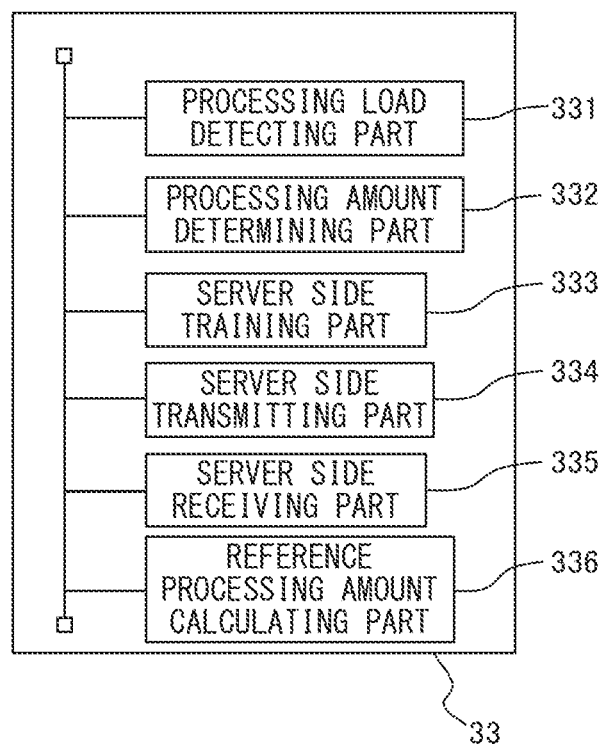
FIG. 9 is a functional block diagram of a processor of a server according to a second embodiment.

FIG. 9 is a functional block diagram of the processor 33 of the server 3 according to the present embodiment. As shown in FIG. 9, in the present embodiment, the processor 33 is provided with a reference processing amount calculating part 336 calculating a reference processing amount, in addition to the functional blocks of the processor 33 according to the first embodiment.

Figure 10:
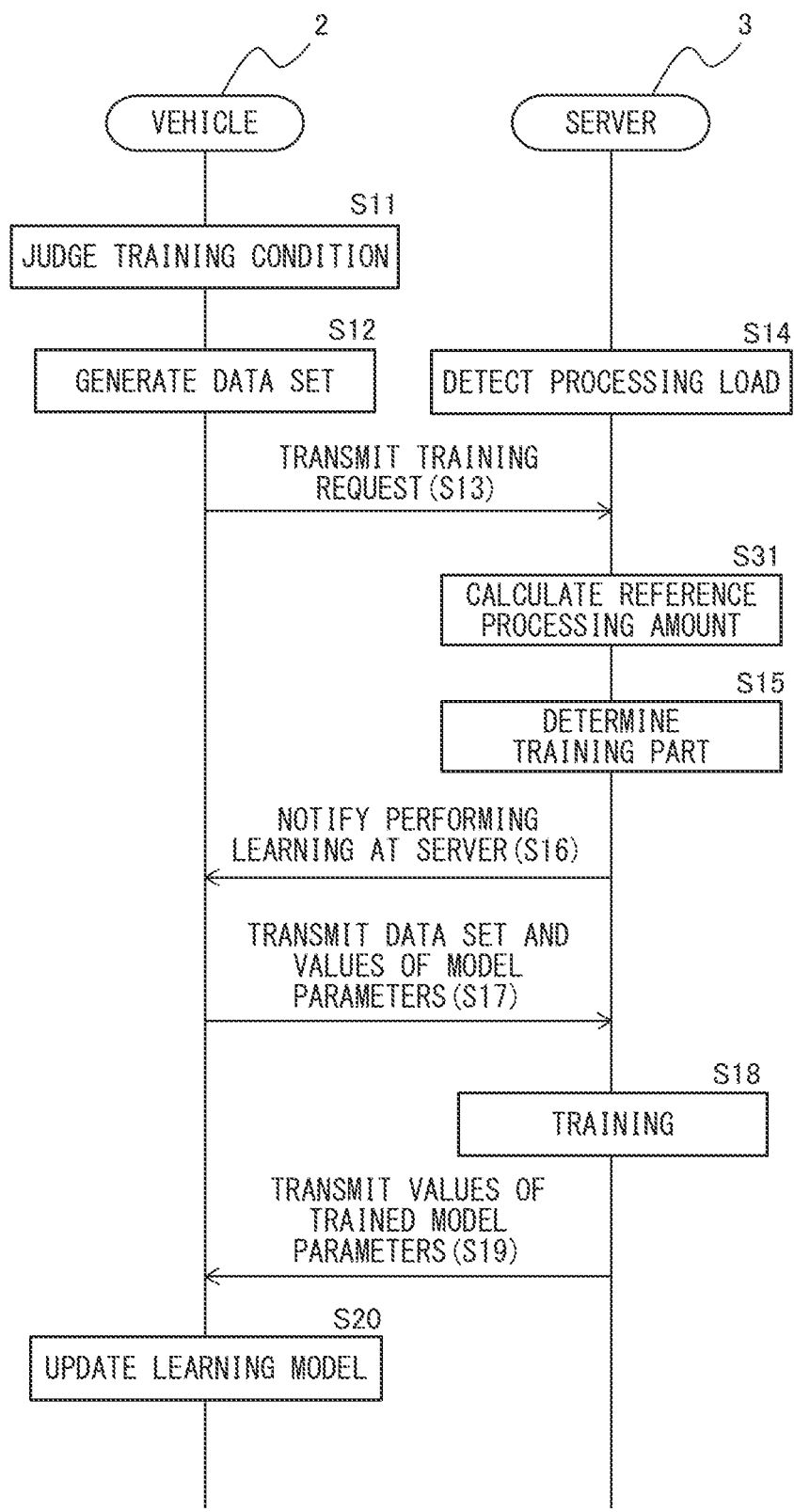
FIG. 10 is an operation sequence diagram, similar to FIG. 7, of training processing in a case where training of a machine learning model according to the present embodiment is performed by the server.

FIG. 10 is an operation sequence diagram, similar to FIG. 7, of training processing in a case where training of a machine learning model according to the present embodiment is performed by the server 3. As shown in FIG. 10, in the present embodiment, if the server side receiving part 335 receives a request signal through the external communication module 31, the reference processing amount calculating part 336 calculates the reference processing amount (step S31).

In calculating the reference processing amount, the reference processing amount calculating part 336 calculates the anticipated vehicle training time taken if assuming performing the training of the machine learning model at the vehicle side training part 145 based on the training data set generated by the data set generating part 143. The anticipated vehicle training time is, for example, calculated based on the computing ability based on the processing ability of the processor 14 of the vehicle 2 and the capacity of the semiconductor memory, the size of the training data set, and configuration of the machine learning model. The anticipated vehicle training time is calculated so as to become shorter as the processing ability of the vehicle 2 becomes higher, and calculated so as to become longer as the size of the training data set becomes larger and as the configuration of the machine learning model becomes more complicated.

In addition, in calculating the reference processing amount, the reference processing amount calculating part 336 calculates the anticipated communication time required for sending and receiving the training data set and the values of the model parameters between the vehicle 2 and the server 3. The anticipated communication time is the time required when training is performed by the server 3. The anticipated communication time is, for example, calculated based on the size of the training data set, number of model parameters of the machine learning model, and the signal strength of wireless communication between the vehicle 2 and the server 3. The anticipated communication time is calculated to become longer as the size of the training data set becomes larger and as the number of model parameters becomes larger, and calculated to become shorter as signal strength in wireless communication becomes higher. The signal strength in wireless communication may include not only the current signal strength, but also the future anticipated signal strength. The future anticipated signal strength is, for example, estimated from the future planned running route of the vehicle 2. Therefore, for example, if the vehicle 2 is planned to be running on a mountain road with a low signal strength, the future anticipated signal strength is set to a low value.

After that, the reference processing amount calculating part 336 calculates the time difference calculated by the anticipated communication time from the anticipated vehicle training time at the vehicle 2. If the time required for the training at the server 3 is longer than the time difference calculated in this way, it means the time required for server processing will be longer than the time required for vehicle processing. On the other hand, if the time required for the training at the server 3 is equal to or less than the time difference calculated in this way, it means the time required for server processing will be equal to or less than the time required for vehicle processing.

On the other hand, the speed of computer processing at the server 3 changes in accordance with the processing load of the server 3. When the processing load of the server 3 is high, the speed of computer processing at the server 3 is slow, therefore the time required for performing training is longer. Conversely, when the processing load of the server 3 is low, the speed of computer processing at the server 3 is fast, therefore the time required for performing training is shorter.

Therefore, in the present embodiment, the reference processing amount calculating part 336 sets, as the reference processing load, a load where the above time difference would become necessary for performing the training of the machine learning model at the server 3 (below, referred to as a "load corresponding to the time difference"). As a result, at the server 3, the training is performed when the current processing load is equal to or less than the reference processing load, therefore the training is performed at the server 3 only when the time required for server processing is equal to or less than time required for vehicle processing.

Note that, in the present embodiment, the reference processing load is set to a load corresponding to the time difference. However, the reference processing load may also be set to a load lower than the load corresponding to the time difference. Even in this case, it is possible to make the server 3 perform the training only when the time required for server processing is equal to or less than the time required for vehicle processing. Further, the reference processing load may, for example, also be a load lower than the load corresponding to the time difference and a load changing in accordance with the type of the machine learning model.

Third Embodiment

Next, referring to FIG. 11, a machine learning system 1 according to a third embodiment and a machine learning method performed at the machine learning system 1 according to the third embodiment will be explained. The configuration and processing of the machine learning system 1 according to the third embodiment are basically similar to the configurations and processing of the machine learning systems 1 according to the first embodiment and second embodiment. Below, the points of difference from the machine learning systems 1 according to the first embodiment and second embodiment will be focused on in the explanation.

In the machine learning systems 1 according to the first embodiment and second embodiment, all of the training processing is performed at either the vehicle 2 or the server 3. As opposed to this, in the present embodiment, the training processing of the machine learning model is performed dispersed between the vehicle 2 and the server 3 in accordance with the processing load of the server 3.

FIG. 11 is an operation sequence diagram, similar to FIG. 7, of training processing according to the present embodiment. Steps of the processing similar to the processing performed at FIG. 7 are assigned similar numbers and explanations of the processing are omitted.

In the present embodiment, as shown in FIG. 11, if the server side receiving part 335 receives a request signal, the processing amount determining part 332 determines the processing amounts of the training respectively performed by the server 3 and the vehicle 2, based on the current processing load of the server 3 detected by the processing load detecting part 331 (step S35). In the present embodiment, as the current processing load of the server 3 becomes higher, the amount of processing of the training at the server 3 decreases more, and the amount of processing of the training at the vehicle 2 increases more. Note that, the amounts of processing of the training at the server 3 and the vehicle 2 may be changed in steps or may be changed continuously in accordance with the processing loads. Therefore, if expressing the above summarized, in all of the embodiments, including the first embodiment and second embodiment, the processing amount of the training performed at the server 3 is made smaller, when the current processing load of the server 3 is relatively high compared to when it is relatively low.

If the processing amounts are determined by the processing amount determining part 332, the server side transmitting part 334 transmits a notification of the respective processing amounts of the vehicle 2 and the server 3, to the vehicle 2 through the external communication module 31 (step S36). If the vehicle side receiving part 148 receives this notification, the vehicle side transmitting part 147 transmits the information required for performing the training of the machine learning model of the vehicle 2 through the outside communication module 21 (step S17).

If the server side receiving part 335 receives the information required for performing the training through the external communication module 31, the server side training part 333 performs the training of the values of the model parameters of the machine learning module in accordance with the processing amount at the server 3 determined at step S35 (step S37). The server side training part 333 uses the current values of the model parameters transmitted from the vehicle 2 as the initial values, and updates, by using the training data set, the values of the model parameters by the above-mentioned error backpropagation or other known technique. At this time, the server side training part 333 ends the training processing before the training of the machine learning model is completed, so long as the processing amount at the server 3 determined at step S35 is not the entire amount of processing of the training.

If training of the machine learning model at the server side training part 333 ends, the server side transmitting part 334 transmits the values of the model parameters in the middle of training obtained by the training performed by the server side training part 333, through the external communication module 31 to the vehicle 2 (step S38).

If the vehicle side receiving part 148 receives the values of the model parameters in the middle of training, the vehicle side training part 145 uses the values of the model parameters in the middle of training transmitted from the server 3 as the initial values, and updates, by using the training data set, the values of the model parameters of the machine learning model, in accordance with the processing amount at the vehicle 2 determined at step S35 (step S39). The training at the vehicle side training part 145 is performed until the training is completed, then the vehicle side training part 145 generates the trained machine learning model.

Note that, in the above embodiments, the processing amount determining part 332 determines the processing amounts of the training performed respectively at the server 3 and the vehicle 2. However, the processing amount determining part 332 may also determine the ratio between the processing amount performed at the server 3 and the processing amount performed at the vehicle 2 (processing ratio). Further, in the above embodiments, first, the training of the machine learning model is performed up to middle at the server 3, then the training of the machine learning model is performed at the vehicle 2 until completion. However, it is also possible to first have the training of the machine learning model be performed up to the middle at the vehicle 2, and then have the training of the machine learning model be performed at the server 3 until completion.

Above, embodiments according to the present disclosure were explained, but the present disclosure is not limited to these embodiments and can be corrected and changed in various ways within the language of the claims.

The invention claimed is:

1. A machine learning method for performing training of weights and biases of a neural network forming a machine learning model in a machine learning system including a vehicle having the machine learning model used for control of mounted equipment and a server able to communicate with the vehicle, the machine learning method comprising:
transmitting, by the vehicle, a request signal requesting training of the weights and biases of the neural network to the server;
detecting, by the server, a current processing load of the server;
determining, by the server, processing amounts or a processing ratio of training respectively performed by the server and the vehicle, based on the processing load, when receiving the request signal from the vehicle;
performing, by the server, training of the weights and biases of the neural network based on a training data set for training of the weights and biases of the neural network in accordance with the determined processing amount or processing ratio of training in the server;
performing, by the vehicle, training of the weights and biases of the neural network based on the training data set in accordance with the determined processing amount or processing ratio of training in the vehicle;
detecting sensor data associated with the vehicle;

inputting the sensor data into the machine learning model; and controlling one or more operations of the vehicle based on an output of the machine learning model, wherein the server decreases a processing amount or processing ratio of training at the server when the processing load is relatively high compared to when it is relatively low.

2. The machine learning method according to claim 1, wherein the server determines to make all of the processing of the training be performed at the vehicle when the processing load is higher than a predetermined reference processing load, and to make all of the processing of the training be performed at the server when the processing load is equal to or less than the reference processing load.

3. The machine learning method according to claim 2, wherein the reference processing load is changed in accordance with a type of the machine learning model.

4. The machine learning method according to claim 3, wherein the reference processing load is higher when the machine learning model is a model relating to safety of the vehicle, compared to when the machine learning model is not a model relating to safety of the vehicle.

5. The machine learning method according to claim 2, further comprising:

calculating an anticipated training time in the case of performing training at the vehicle based on the training data set and an anticipated communication time required for transmission and reception of the training data set and the model parameters between the vehicle and the server, wherein the reference processing load is a load equal to or lower than a load by which a time period calculated by subtracting the anticipated communication time from the anticipated training time is required for performing training of the weights and biases of the neural network at the server.

6. A machine learning system including a vehicle having a machine learning model used for control of mounted equipment and a server able to communicate with the vehicle and performing training of weights and biases of a neural network forming the machine learning model, wherein the vehicle comprises:

a training request transmitting part transmitting configured to transmit a request signal requesting training of the weights and biases of the neural network to the server; and a vehicle side training part preforming configured to perform training of the weights and biases of the neural network based on a training data set for training of the weights and biases of the neural network, the server comprises:

a processing load detecting part detecting configured to detect a current processing load of the server;

a processing amount determining part configured to determine processing amounts or a processing ratio of training respectively performed by the server and vehicle, based on the processing load, when receiving the request signal from the vehicle;

a server side training part configured to perform training of the weights and biases of the neural network based on the training data set and a control part configured to receive sensor data associated with the vehicle, and control one or more operations of the vehicle based on an output of the machine learning model, the server side training part and the vehicle side training part are configured to respectively perform training of the weights and biases of the neural network in accordance with the determined processing amounts or processing ratio of the training, and the processing amount determining part is configured to decrease a processing amount or processing ratio of training at the server side training part when the processing load is relatively high compared to when it is relatively low.

7. The machine learning system according to claim 6, wherein the vehicle includes a vehicle processor and the server includes a server processor, wherein the vehicle processor is the training request transmitting part and vehicle side training part, wherein the server processor is the processing load detecting part, the processing amount determining part, and the server side training part.

8. A server being able to communicate with a vehicle having a machine learning model used for control of mounted equipment and performing training of weights and biases of a neural network forming the machine learning model, the server comprising:

a load detecting part configured to detect a current processing load of the server;

a processing amount determining part configured to determine processing amounts or a processing ratio of training respectively performed by the server and vehicle, based on the processing load, when receiving the request signal requesting training of the weights and biases of the neural network to the server, from the vehicle;

a training part configured to perform training of the weights and biases of the neural network, based on a training data set for training of the weights and biases of the neural network in accordance with the determined processing amount or processing ratio of training in the server; and a transmitting part configured to transmit the weights and biases of the neural network obtained by the training to the vehicle, when the training of the weights and biases of the neural network is performed to cause the vehicle to control one or more operations of the vehicle, and the processing amount determining part is configured to decrease a processing amount or processing ratio of training at the server when the processing load is relatively high compared to when it is relatively low.

9. The server according to claim 8 further comprising a processor, wherein the processor is the load detecting part, the processing amount determining part, the training part, and the transmitting part.

10. The machine learning method according to claim 1, further comprising:

calculating an anticipated training time in the case of performing training at the vehicle based on the training data set and an anticipated communication time required for transmission and reception of the training data set between the vehicle and the server, wherein the server changes, continuously or in steps, the processing amounts or a processing ratio of the training, based on the value obtained by subtracting the anticipated communication time from the anticipated training time so that the processing amount or the processing ratio of the training performed at the server is made smaller, when the processing load is relatively high, compared to when it is relatively low.

* * * * *